(12) United States Patent
Chen et al.

(10) Patent No.: US 8,939,585 B2
(45) Date of Patent: Jan. 27, 2015

(54) STEREO DISPLAY SYSTEM

(71) Applicant: Industrial Technology Research Institute, Hsinchu (TW)

(72) Inventors: Chang-Ying Chen, Kaohsiung (TW); Chao-Hsu Tsai, Hsinchu (TW); Chang-Shuo Wu, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 115 days.

(21) Appl. No.: 13/905,125

(22) Filed: May 29, 2013

(65) Prior Publication Data
US 2014/0185015 A1 Jul. 3, 2014

(30) Foreign Application Priority Data

Dec. 28, 2012 (TW) .............................. 101150811 A

(51) Int. Cl.
G03B 21/14 (2006.01)
G02B 27/22 (2006.01)
H04N 13/04 (2006.01)

(52) U.S. Cl.
CPC ........ G02B 27/2214 (2013.01); H04N 13/0402 (2013.01); H04N 13/0459 (2013.01)
USPC ...... 353/7; 353/94; 348/54; 348/59; 359/458; 352/61

(58) Field of Classification Search
USPC ............. 353/7, 10, 94; 349/15; 359/458, 466, 359/471, 472, 478, 479; 348/51, 52, 54, 59; 352/61
See application file for complete search history.

(56) References Cited

U.S. PATENT DOCUMENTS

| | | | | |
|---|---|---|---|---|
| 2,800,054 | A * | 7/1957 | Allison | 353/38 |
| 6,201,565 | B1 | 3/2001 | Balogh | |
| 7,139,042 | B2 * | 11/2006 | Nam et al. | 349/15 |
| 7,425,070 | B2 * | 9/2008 | Hsu | 353/7 |
| 7,648,243 | B2 * | 1/2010 | Shestak et al. | 353/7 |

(Continued)

FOREIGN PATENT DOCUMENTS

TW  201227089  7/2012

OTHER PUBLICATIONS

Liao et al., "High-quality integral videography using a multiprojector," Optics Express 12 (6), Mar. 22, 2004, pp. 1067-1076.

(Continued)

Primary Examiner — William C Dowling
(74) Attorney, Agent, or Firm — Jianq Chyun IP Office

(57) ABSTRACT

A stereo display system including a plurality of projection apparatuses and a screen module is provided. The projection apparatuses project a plurality of image beams. The screen module is disposed in front of the projection apparatuses, wherein the image beams are transmitted toward the screen module. The screen module includes a light diffusion layer and a beam splitting layer. The light diffusion layer has at least one diffusion direction, and the light diffusion layer diffuses the image beams with a diffusion angle. The light diffusion layer is disposed between the beam splitting layer and the projection apparatuses, wherein each of the image beams is divided into a plurality of sub image beams by the beam splitting layer. The sub image beams of each image beam transmit with different angles, such that the image beams form a plurality of stereo image viewing zones after passing through the screen module.

21 Claims, 15 Drawing Sheets

(56) References Cited

U.S. PATENT DOCUMENTS

| | | |
|---|---|---|
| 7,959,294 B2 | 6/2011 | Balogh |
| 8,228,448 B2 * | 7/2012 | Shiau et al. .................... 349/15 |
| 8,240,854 B2 | 8/2012 | Krijn et al. |
| 8,305,511 B2 * | 11/2012 | Shiau et al. .................... 349/51 |
| 2003/0156077 A1 | 8/2003 | Balogh |
| 2012/0105806 A1 * | 5/2012 | Kuo et al. ........................ 353/7 |
| 2012/0127320 A1 | 5/2012 | Balogh |
| 2013/0057830 A1 * | 3/2013 | Tsai et al. ........................ 353/7 |

OTHER PUBLICATIONS

Kim et al., "Wide-viewing-angle integral three-dimensional imaging system by curving a screen and a lens array," Applied Optics 44 (4), Feb. 1, 2005, pp. 546-552.

Balogh et al., "A Scalable Hardware and Software System for the Holographic Display of Interactive Graphics Applications," Eurographics, Aug. 26-Sep. 2, 2005, pp. 1-4.

Okui et al., "Optical screen for direct projection of integral imaging," Applied Optics 45 (36), Dec. 20, 2006, pp. 9132-9139.

Sakai et al., "Autostereoscopic Display Based on Enhanced Integral Photography Using Overlaid Multiple Projectors," SID 09 Digest 40 (1), Jun. 2009, pp. 611-614.

Wu et al., "Analysis of motion parallax between integral imaging and multi-view 3D Display," The 4th International Conference on 3D Systems and Applications, Jun. 25-27, 2012, pp. 1-3.

* cited by examiner

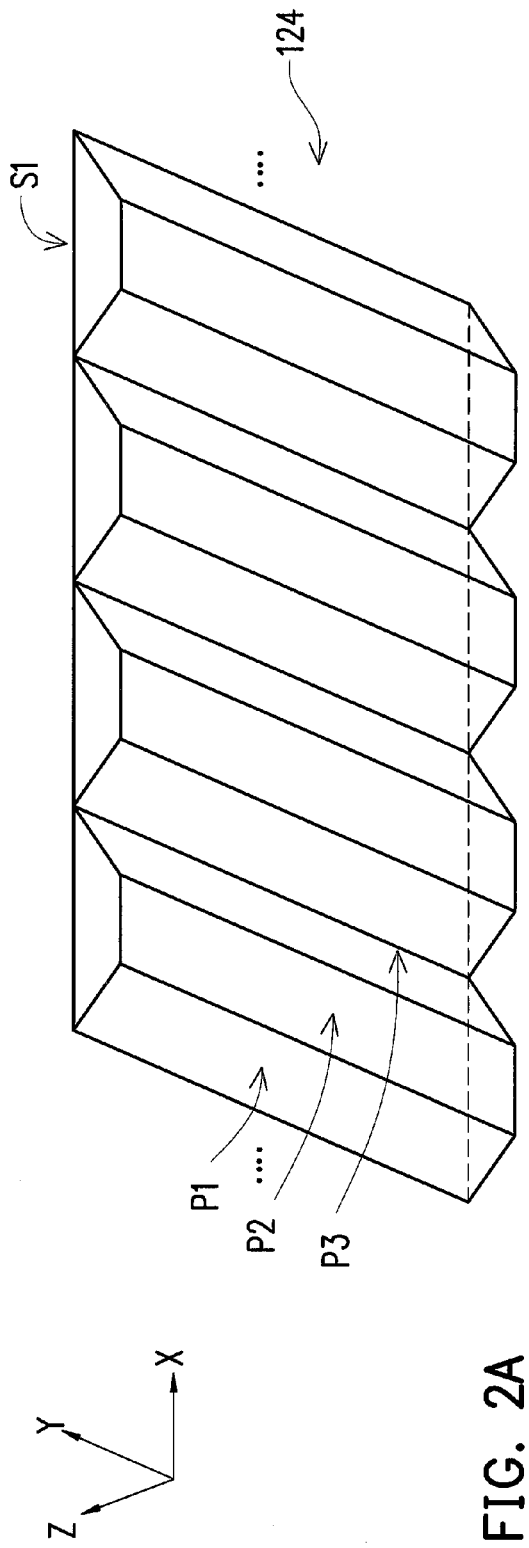
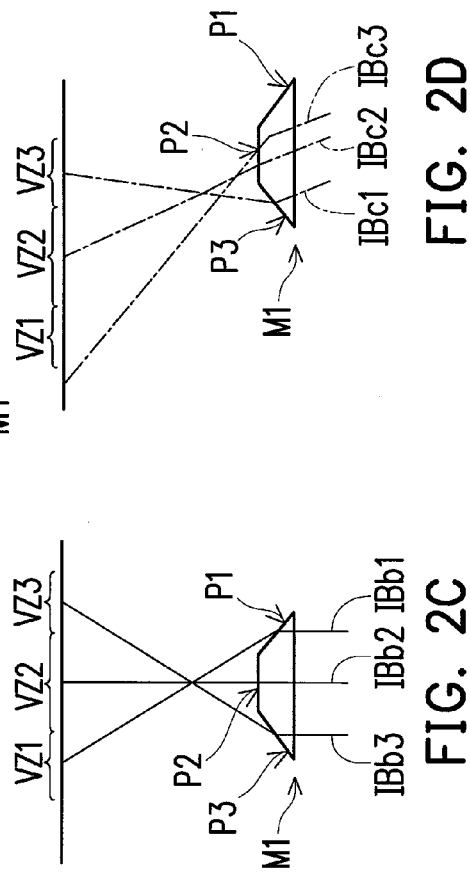
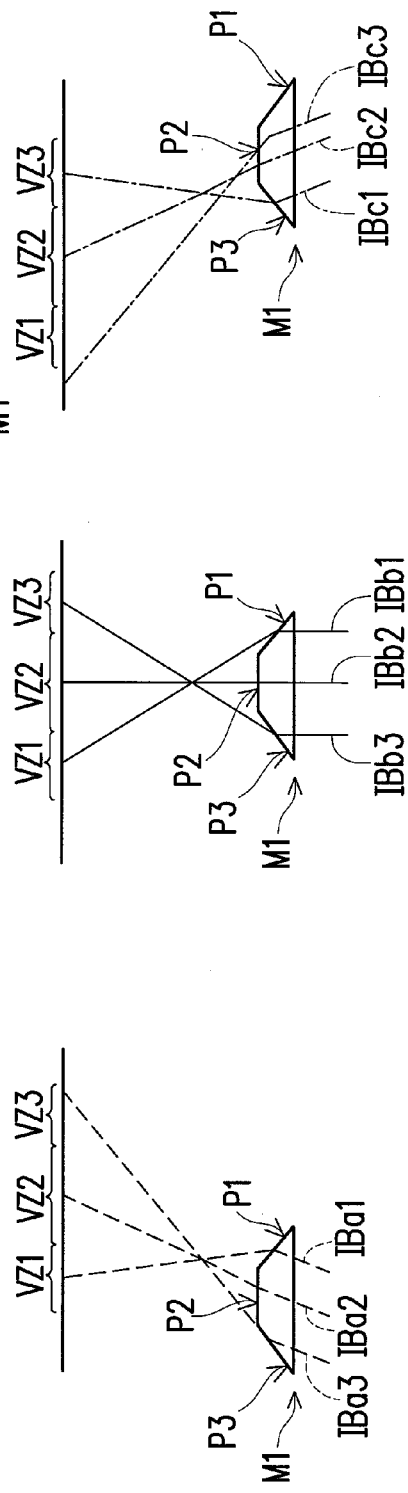
FIG. 2A
FIG. 2B
FIG. 2C
FIG. 2D

STEREO DISPLAY SYSTEM

CROSS-REFERENCE TO RELATED APPLICATION

This application claims the priority benefit of Taiwan application serial no. 101150811, filed on Dec. 28, 2012. The entirety of the above-mentioned patent application is hereby incorporated by reference herein and made a part of this specification.

TECHNICAL FIELD

The disclosure relates to a display system and a stereo display system.

BACKGROUND

As the progress of display technology and every kind of technology craft, various display apparatus have been invented. For example, from compact hand-held displays to high definition display screens or even stereo displays, these displays provide almost-real images. The vivid images with almost-real image quality render human drawing imaginations. The astounding advances and consumption demands for stereo display technology massively grow, such that the quantity of stereo display sold in 2010 reaches a number of millions. While the rapidly decreasing price and the generalization of the contents, stereo display industry would grow fast. However, most of the commercially available stereo displays provide stereo images only when viewers wear special made glasses, such as polarization anaglyph glasses or color anaglyph glasses, which are contrary to human natural visions. Therefore, the auto-stereoscopic technology will become a critical developing trend in the next generation.

SUMMARY

In an embodiment of the present disclosure, a stereo display system including a plurality of projection apparatuses and a screen module is provided. The projection apparatuses project a plurality of image beams respectively. The screen module is disposed in front of the projection apparatuses, wherein the image beams are transmitted towards the screen module. The screen module includes a light diffusion layer and a beam splitting layer. The light diffusion layer has at least one diffusion direction and diffuses the image beams along the diffusion direction with a diffusion angle corresponding to the diffusion direction. The light diffusion layer is disposed between the beam splitting layer and the projection apparatuses. Each of the image beams diffused by the light diffusion layer is divided into a plurality of sub image beams after passing through the beam splitting layer, and the sub image beams of each image beams is propagated with different angles, such that the image beams form a plurality of stereo image viewing zones after passing through the screen module.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 2A illustrates a partially enlarged schematic perspective view of the beam splitting layer according to the embodiment of FIG. 1.

FIG. 2B to FIG. 2D illustrate schematic views of various optical paths according to the embodiment of FIG. 2A.

DETAILED DESCRIPTION OF DISCLOSED EMBODIMENTS

Figure 1:
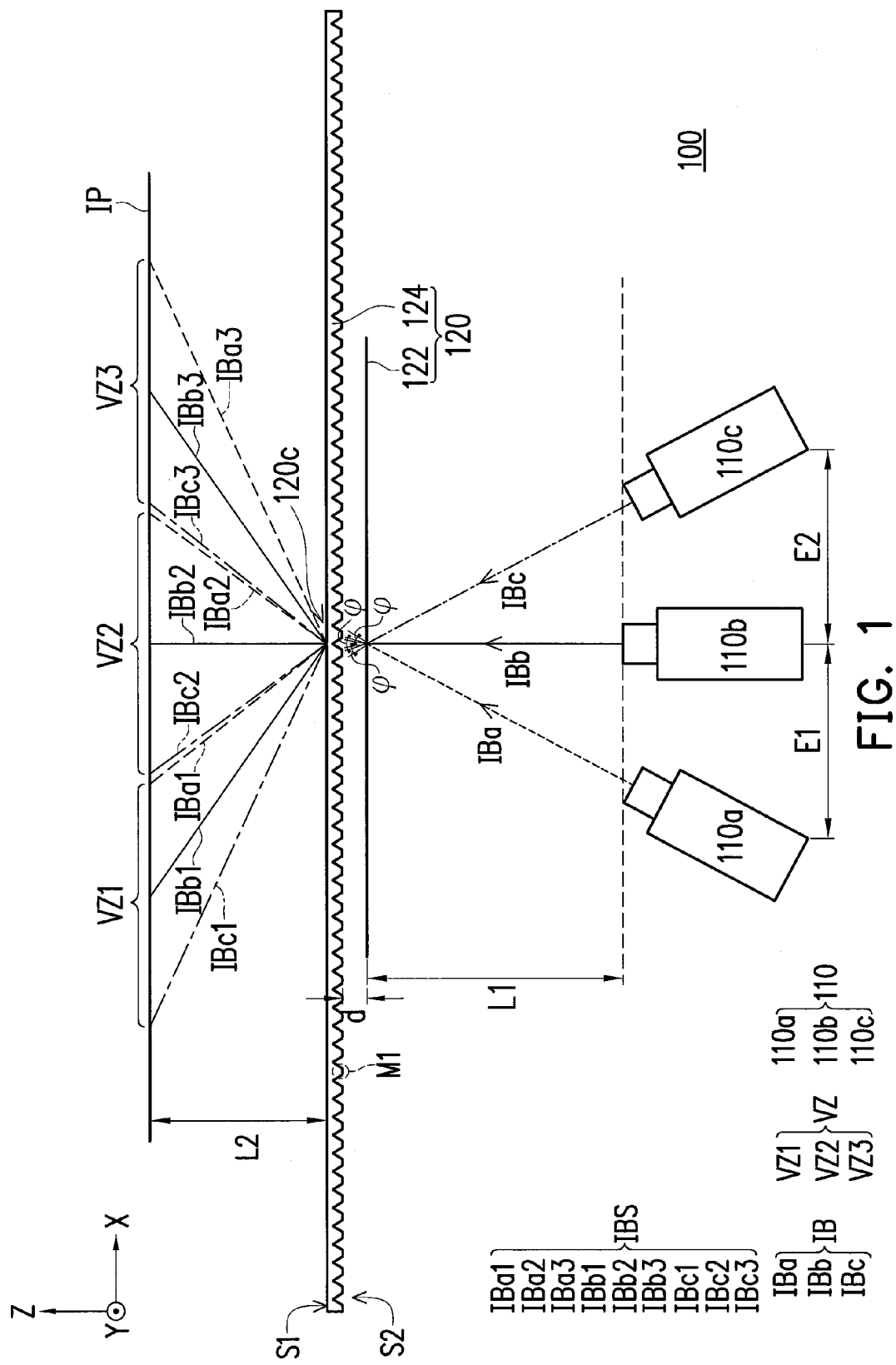
FIG. 1 illustrates a stereo display system according to an embodiment of the present disclosure.

FIG. 1 illustrates a stereo display system according to an embodiment of the present disclosure. Referring to FIG. 1, in this embodiment, the stereo display system includes a plurality of projection apparatuses 110 and a screen module 120. The projection apparatuses 110 project a plurality of image beams IB. In this embodiment, the projection apparatuses 110 are aligned in the direction of X in FIG. 1 for example, but the disclosure is not limited thereto. The screen module 120 is disposed in front of the projection apparatuses 110, wherein the image beams IB are transmitted towards the screen module 120. The screen module 120 includes a light diffusion layer 122 and a beam splitting layer 124. In this embodiment, the distance d between the light diffusion layer 122 and the beam splitting layer 124 is 100 micrometers for example, but the disclosure is not limited thereto. The light diffusion layer 122 has at least one diffusion direction, and the light diffusion layer 122 diffuses the image beams IB along the diffusion direction with a diffusion angle $\phi$ corresponding to the diffusion direction. In this embodiment, the diffusion direction, for example, is along the direction of Y axis in FIG. 1. Generally, the light diffusion layer 122 is disposed between the beam splitting layer 124 and the projection apparatuses 110. Each of the image beams IB diffused by the light diffusion layer 122 is divided into a plurality of sub image beams IBS after passing through the beam splitting layer 124, and the sub image beams IBS of each image beams IB are propagated with different angles, such that the image beams IB form a plurality of stereo image viewing zones VZ after passing the screen module 120.

For example, as illustrated in FIG. 1, the projection apparatuses 110 may include three projection apparatuses 110a, 110b and 110c which project image beam IBa (shown as dotted lines), IBb (shown as solid lines), and IBc (shown as chain lines). In this embodiment, an interval E1 between the projection apparatus 110a and the projection apparatus 110b is 300 millimeters for example, and an interval E2 between the projection apparatus 110b and the projection apparatus 110c is 280 millimeters for example, but the disclosure is not limited thereto. The image beams IBa, IBb, and IBc would be respectively diffused with an angle $\phi$ (the diffusion angel along the Y axis) in the original propagating directions after passing through the light diffusion layer 122 and are transmitted toward the beam splitting layer 124. In this embodiment, the diffusion angle of the angle $\phi$ along the Y axis is about 40 degrees, however, except for the diffusion angle along the Y axis in the light diffusion layer 122, there might as well be an extremely small diffusion angle along the X axis. For example, in this embodiment, the diffusion angle of the light diffusion layer 122 along the X axis is 0.1 degree, but the disclosure is not limited thereto. When passing through the beam splitting layer 124, the image beam IB a, for example, may be divided into sub image beams IBa1, IBa2, and IBa3, the image beam IBb, for example, may be divided into sub image beams IBb1, IBb2, and IBb3, and the image beam IBc, for example, may be divided into sub image beams IBc1, IBc2, and IBc3. The sub image beams IBa1, IBb1, and IBc1 are transmitted toward a first stereo image viewing zone VZ1 after passing through the beam splitting layer 124, the sub image beams IBa2, IBb2, and IBc2 are transmitted toward a second stereo image viewing zone VZ2 after passing through the beam splitting layer 124, and the sub image beams IBa3, IBb3, and IBc3 are transmitted toward a third stereo image viewing zone VZ3 after passing through the beam splitting layer 124. In other words, in this embodiment, viewers may watch the screens in the first stereo image viewing zone, the second stereo image viewing zone, and the third stereo image viewing zone projected from the projection apparatuses 110a, 110b and 110c respectively. Namely, the beam splitting layer 124 may duplicate the image beams IB projected by the projection apparatuses 110 to a plurality of the stereo image viewing zones VZ. In this embodiment, a projection distance L1 may be set on the projection distances of the projection apparatuses 110. For examples, in this embodiment, the projection distance L1 is 1710 mm and a watching distance L2 is 1500 mm, which may be set according to practical needs, and the disclosure is not limited thereto. When the projection apparatuses 110 provides stereo images, the viewers may watch stereo images in these stereo image viewing zones VZ. Therefore, unrecognizable images due to the changes of the stereo image caused by the movement of the viewers can be avoided. Meanwhile, the situation of that the viewers locating at the center of a projection screen might not be able to watch the images on the edge of the projection screen can be avoided as well. In other words, except for the ability of redistributing the images located at the center to the edge of the projection screen when the viewers locate at an edge position corresponding to the projection screen, the beam splitting layer 124 may also capable to redistribute the images located at the edge to the center of the projection screen when the viewers locate at an central position corresponding to the projection screen. Namely, even when the viewers move to the front of the screen, the viewers can still obverse a complete stereo image. Since these stereo image viewing zones VZ carry identical informations, which is not achieve by means of sacrificing spatial resolution, the stereo display system 100 may create a plurality of stereo image viewing zones VZ without sacrificing image resolution by using the beam splitting layer 124. It is worth noting that the number of the projection apparatuses 110, the number of the image beams IB, and the number of the sub image beams IBS are not limited to this embodiment, and may be set different according to the practical needs. For example, when the number of the projection apparatuses 110 increases, the image beams IB of the stereo display system 100 would increase correspondingly, and thus the number of the sub image beams IBS in each of the stereo image viewing zones VZ increases as well, and thus the number of the stereo image viewing zones VZ may increase correspondingly. However, the disclosure is not limited thereto. Accordingly, the stereo display system 100 may provide stereo images with big viewing angle and high resolution. The arrangement for the projection apparatuses 110 and the details description of the beam splitting layer 124 will be described in following paragraphs.

In detail, FIG. 2A illustrates a partially enlarged schematic perspective view of the beam splitting layer according to the embodiment of FIG. 1, and FIG. 2B to FIG. 2D illustrates schematic views of optical paths according to the embodiment of FIG. 2A. Referring to FIG. 1 and FIG. 2D, in this embodiment, the beam splitting layer 124 has a first surface S1 and a plurality of first beam splitting microstructures M1 periodically arranged and disposed on the first surface S1, and each of the first beam splitting microstructures M1 has a plurality of surface planes P with different slopes. In this embodiment, the projection apparatuses 110 are arranged along a first direction (namely, the X axis of 3-dimensional stereo coordination in FIG. 1 and FIG. 2A), and the first beam splitting microstructures M1 and the stereo image viewing zones VZ are also arranged in parallel with the first direction. In this embodiment, the first beam splitting microstructures M1 may be polygon cylindrical lenses, and the extension direction of the first beam splitting microstructures M1 is parallel with a second direction (namely, the direction of the Y axis), and the image beams IB may propagates along the Z axis toward the beam splitting layer 124. In this embodiment, the number of the surface planes is 3, for example. In other words, the first beam splitting microstructures M1 illustrated in this embodiment may be a plurality of trapezoidal beam splitting microstructures, but the disclosure is not limited thereto. In other embodiments, the relation between the number and the slope of the surface planes P may be adjusted corresponding to the practical needs, the disclosure is not limited thereto. It worth noting that the first direction and the second direction mentioned in this specification respectively correspond to the X axis and the Y axis in the 3-dimensional stereo coordination illustrated in the figures, and the projection apparatuses, the light diffusion layer, and the screen module are arranged along the Z axis, but the disclosure is not limited thereto.

In detail, referring to FIG. 2B first, in this embodiment, when the image beam IBa projected by the projection apparatus 110a passes through the beam splitting layer 124, the image beam IBa may be refracted by the first beam splitting microstructure M1 on the beam splitting layer 124 so as to be splitted and then propagated toward different directions. For example, each of the first beam splitting microstructures M1 in FIG. 2B includes 3 surface planes P1, P2, and P3 with different slopes. The surface plane P1 may refract the sub image beam IBa1 of the image beam IBa projected by the projection apparatus 110a to the first stereo image viewing zone VZ1, the surface plane P2 may refract the sub image beam IBa2 of the image beam IBa projected by the projection apparatus 110a to the first stereo image viewing zone VZ2, the surface plane P3 may refract the sub image beam IBa3 of the image beam IBa projected by the projection apparatus 110a to the first stereo image viewing zone VZ3. Similarly, in FIG. 2C, the sub image beams IBb1, IBb2, and IBb3 of the image beam IBb projected by the projection apparatus 110b may be refracted by the surface planes P1, P2 and P3 of the first beam splitting microstructures M1 respectively to the first stereo image viewing zone VZ1, the second stereo image viewing zone VZ2, and the third stereo image viewing zone VZ3. In FIG. 2D, the sub image beams IBc1, IBc2, and IBc3 of the image beam IBc projected by the projection apparatus 110c may be refracted by the surface planes P1, P2 and P3 of the first beam splitting microstructures M1 respectively to the first stereo image viewing zone VZ1, the second stereo image viewing zone VZ2, and the third stereo image viewing zone VZ3. Furthely, in this embodiment, the number of the surface planes of each of the first beam splitting microstructures M1 is M, and the image beams may be duplicated into M copies, and namely, the number of the stereo image viewing zones VZ may be M. Hereby, the beam splitting layer 124 may duplicate the image beams IBa, IBb, and IBc to a plurality of the stereo image viewing zones VZ. The viewing angle of the stereo display system 100 may be improved without affecting the resolution of each projection pixel in the stereo image viewing zones VZ. However, it worth noting that, when designing the surface planes P of the first beam splitting microstructures M1, an incident angle of the image beams IB incident from the projection apparatuses 110 must be taken into consideration. Namely, the incident angle of the image beams IB incident from the projection apparatuses 110 is smaller than the critical angle of the surface planes P on the first beam splitting microstructures M1, so as to prevent from total internal reflection which causes parts of image loss. Moreover, the size of the first beam splitting microstructures M1 is smaller than the size of the projection image pixels, so as to prevent the images from partially or totally overlapped with each others.

Figure 3A:
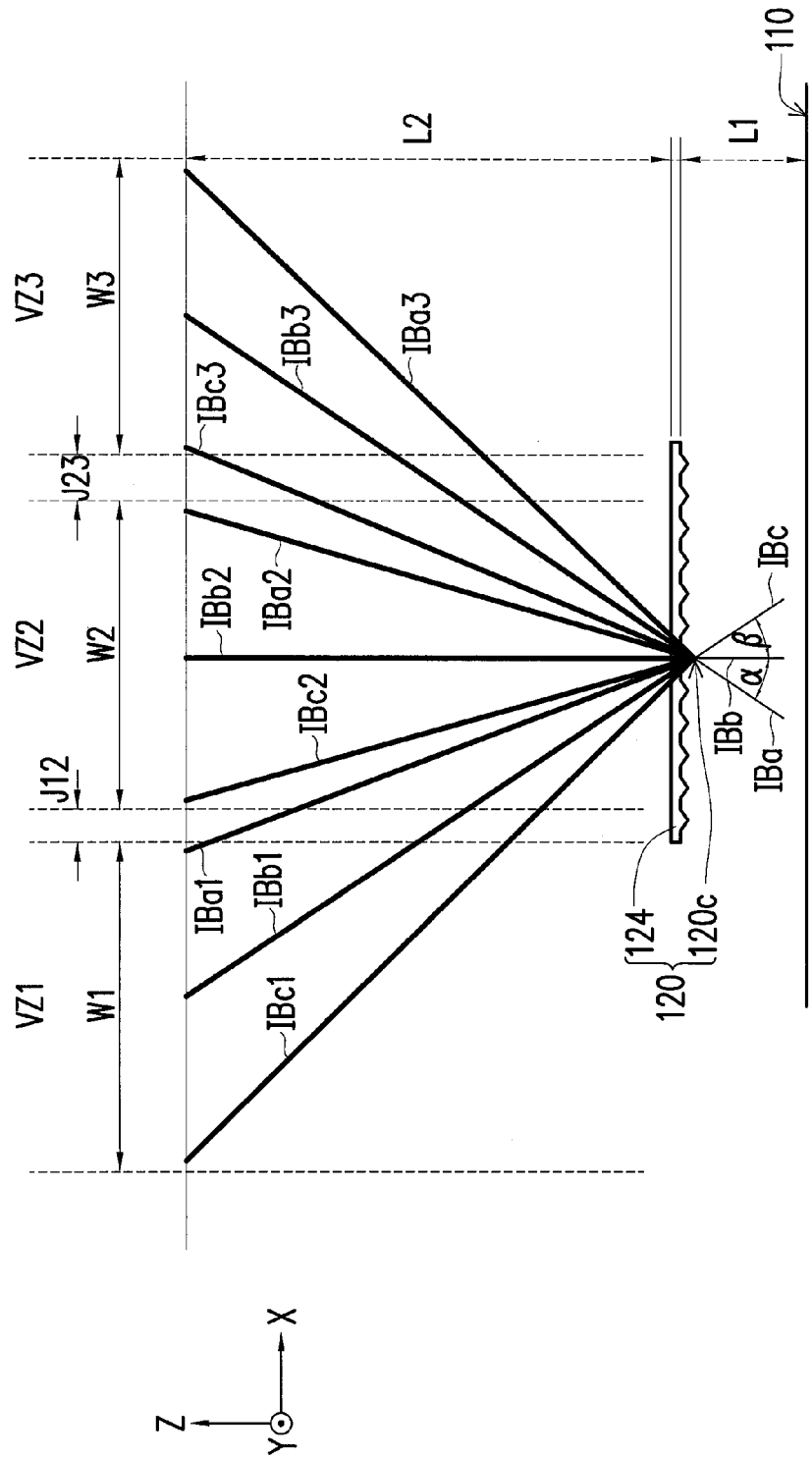
FIG. 3A, FIG. 3C and FIG. 3E illustrate partial schematic views of the stereo display system according to the embodiment in FIG. 1.
Figure 3B:
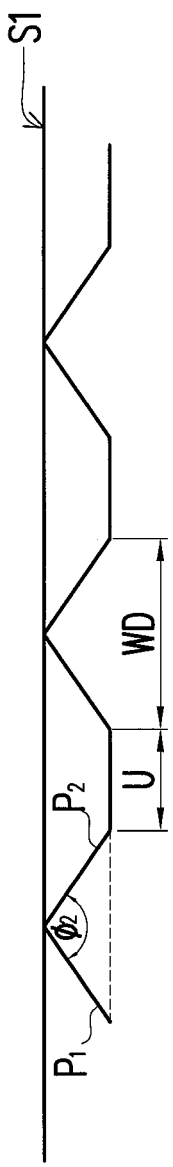
FIG. 3B, FIG. 3D and FIG. 3F illustrate partially enlarged schematic views of the first beam splitting microstructures according to the embodiment in FIG. 3A, FIG. 3C and FIG. 3E respectively.
Figure 3C:
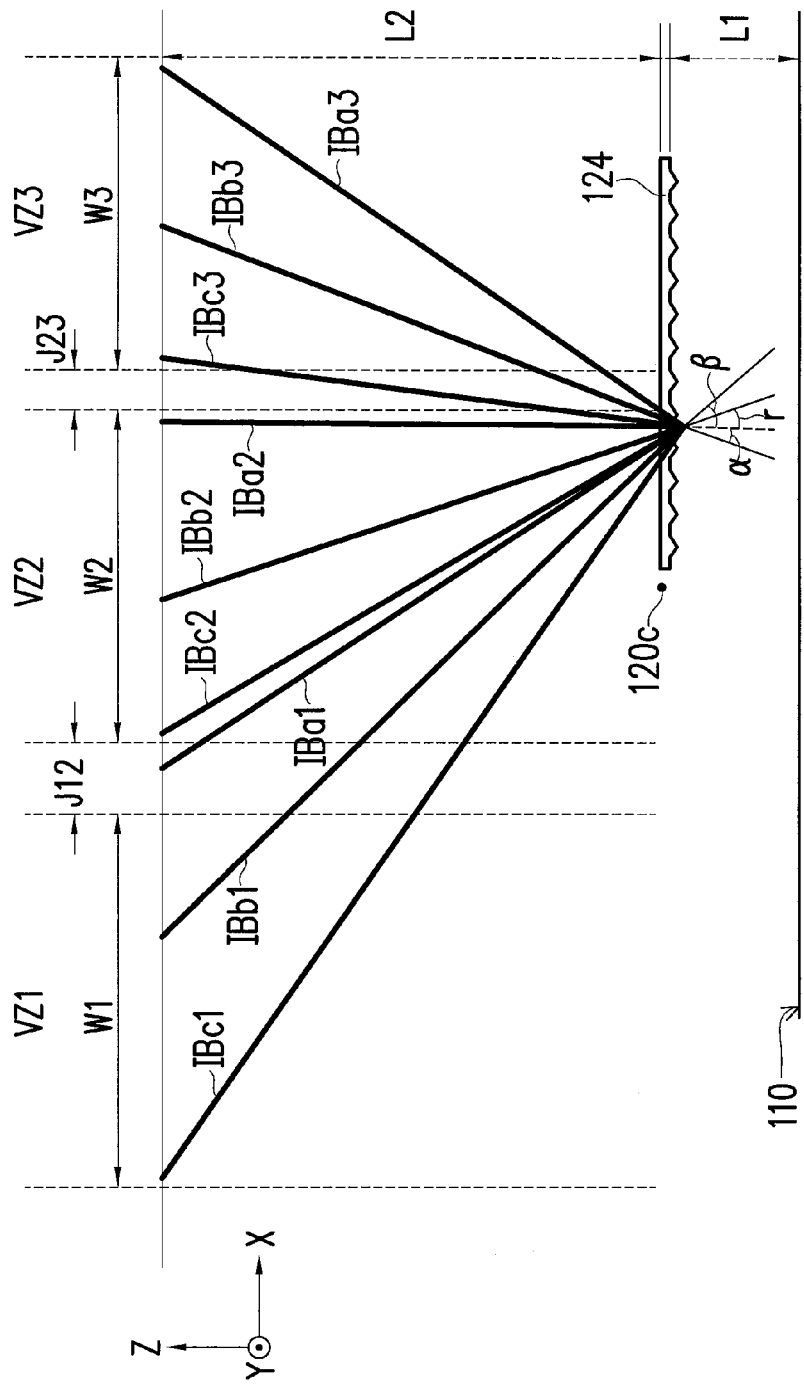
Figure 3D:
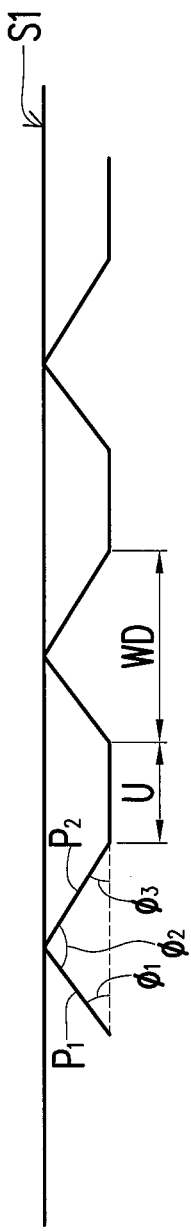
Figure 3E:
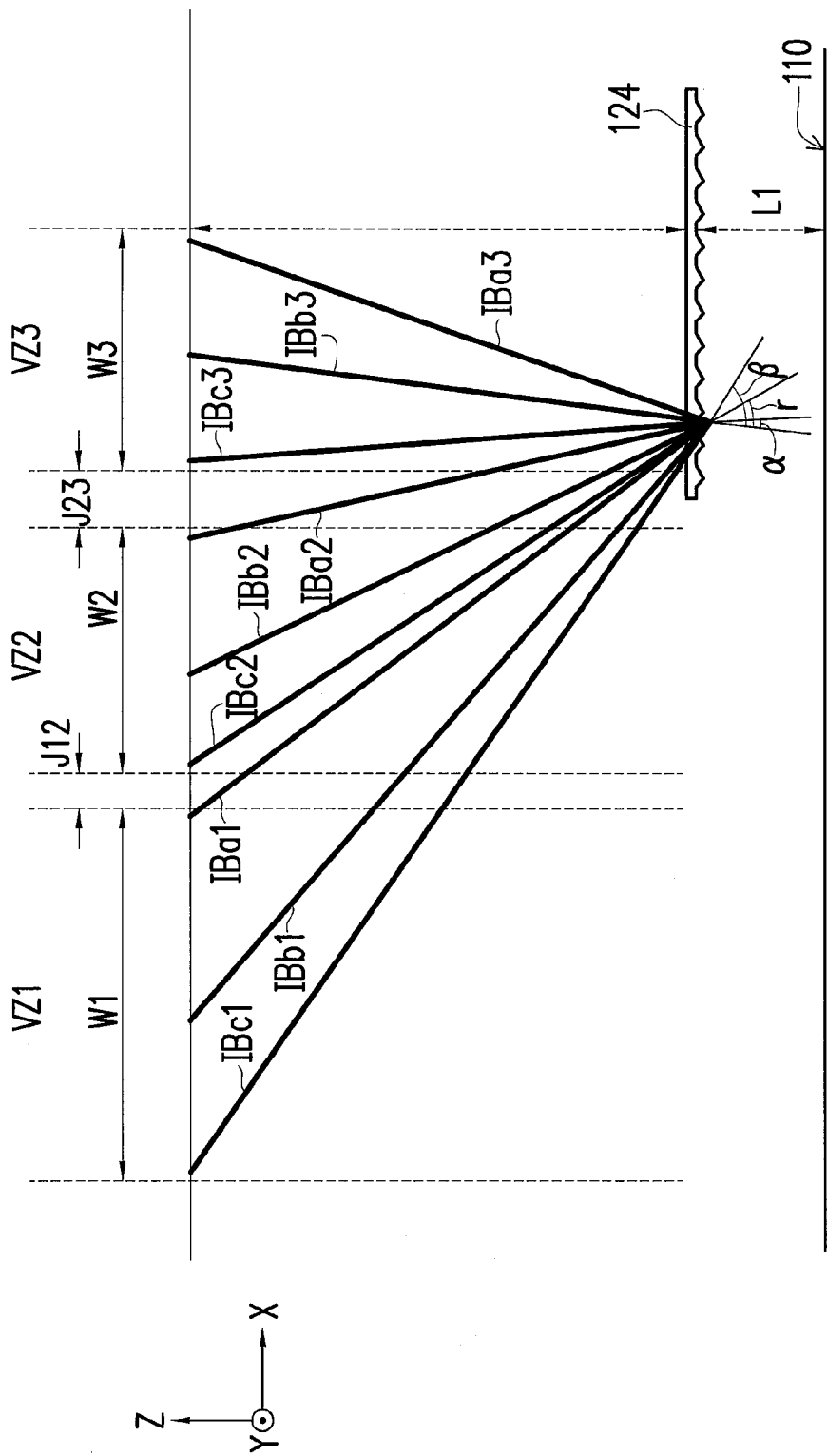
Figure 3F:
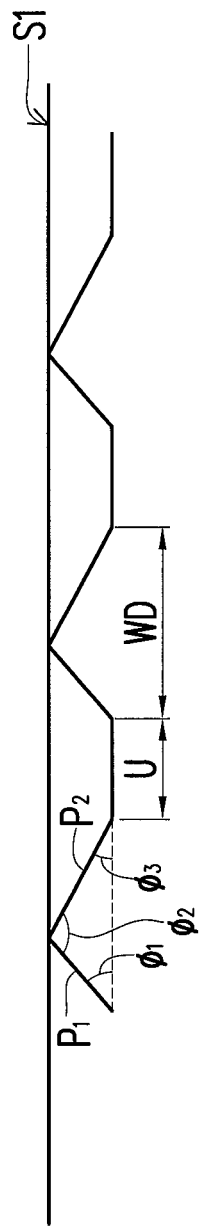

FIG. 3A, FIG. 3C and FIG. 3E illustrate partial schematic views of the stereo display system according to the embodiment in FIG. 1. FIG. 3B, FIG. 3D and FIG. 3F illustrate partially enlarged schematic views of the first beam splitting microstructures according to the embodiment in FIG. 3A, FIG. 3C and FIG. 3E respectively. Referring to FIG. 1, FIG. 3A to FIG. 3F, in this embodiment, the screen module 120 may have a screen center 120c. In the first beam splitting microstructures M1 of the beam splitting layer 124, the absolute value of the slope of the surface plane P1 which is in touch with the first surface S1 and close to a region of the screen center 120c is greater than the absolute value of the slope of the surface plane P3 which is in touch with the first surface S1 and far from the region of the screen center 120c. For example, referring to FIG. 3A first, in this embodiment, in order to maintain symmetric image distribution of the image beams IB in each stereo image viewing zones VZ (namely, to prevent excessive differences between the stereo image viewing zones VZ, wherein the viewer may observe an obvious disparity results from the differences between the stereo image viewing zones VZ), the surface planes P1 and P3 of the first beam splitting microstructures M1 which are close to the region of the screen modules 120 may have different slopes, so as to adjust the positions of the stereo image viewing zones VZ. In FIG. 3A, the image beam IBb is propagated in the direction perpendicular to the screen module 120 to an observation plane IP, and the image beam IBb is transmitted through right side of the screen center 120c of the screen module 120, and an included angle α between the image beam IBa and the image beam IBb is about −9.3 degrees, and an included angle β between the image beam IBb and the image beam IBc is about 9.95 degrees. Therefore, in order to maintain symmetric image distribution of the stereo image viewing zones VZ, the absolute value of the slope of the surface plane P1 (the surface plane P1 is close to the screen center 120c) may be designed to be greater than the absolute value of the slope of the surface plane P3. However, it is worthy noting that the disclosure is not limited thereto, namely, the disclosure is not limited the first beam splitting structures M1 in the beam splitting layer 124 to that the absolute value of the slope of the surface plane P1 which is in touch with the first surface S1 and close to a region of the screen center 120c must be greater than the absolute value of the slope of the surface plane P3 which is in touch with the first surface S1 and far from the region of the screen center 120c. According to another embodiment, in the first beam splitting structures M1 of the beam splitting layer 124, the absolute value of the slope of the surface plane P1 which in touch with the first surface S1 and close to the region of the screen center 120c may be equal to zero, or the absolute value of the slope of the surface plane P3 which is in touch with the first surface S1 and away from the region of the screen center 120c may be equal to zero.

In detail, in FIG. 3A and FIG. 3B, since the surface plane P1 and the surface plane P3 are both close to the screen center 120c, the absolute values of the slopes of the surface planes P1 and P3 are thus close. In this embodiment, the included angle φ2 between the surface plane P1 and the surface plane P3 is about 111 degrees, the included angle φ1 between the surface plane P1 and the first surface S1 is about 34.55 degrees, and the included angle φ3 between the surface plane P3 and the first surface S1 is about 34.45 degrees. Therefore, a distance J12 (for example, 17 mm in FIG. 3A) between the first stereo image viewing zone VZ1 and the second stereo image viewing zone VZ2 and a distance J23 (for example, 18 mm in FIG. 3A) between the second stereo image viewing zone VZ2 and the third stereo image viewing zone VZ3 may become similar as well, wherein the widths W1, W2, and W3 of the first stereo image viewing zone VZ1 (529 mm for example), the second stereo image viewing zone VZ2 (510 mm for example), and the third stereo image viewing zone VZ3 (519 mm for example) on the observation plane IP are similar, such that the viewer locates in each stereo image viewing zones VZ may be capable of observing complete stereo images, and would not observe black band pattern caused by no image displaying or bright stripes caused by excessive overlapping images. It worth noting that the numeral value of the included angles φ1, φ2, φ3, and the scale and interval of each stereo image viewing zones VZ are derived under the conditions which are the width WD of the first beam splitting microstructure M1 is 300 micrometers, the interval U between the first beam splitting microstructures M1 is 150 micrometers, the distance L1 between the projection apparatuses 110 and the screen module 120 is 1710 mm for example, and the distance L2 between the observation plane IP and the screen module 120 is 1500 mm for example. However, the disclosure is not limited thereto, and in other embodiments, the above numeral values may be adjusted according to practical situations without departing from the category of the disclosure. The above numeral values are calculated to meet the purpose of comfortable viewing ranges for human eyes, namely each stereo image viewing zones VZ includes a range of 20-degree-angle (for example, provided thirty projection apparatuses 110 for projecting, each of the projection apparatuses 110 covers a range of 0.7-degree-angle), the refractive index of the beam splitting layer 124 is 1.5 for example, and the distance between the light diffusion layer 122 and the beam splitting layer 124 is 100 micrometers for example. However, in other embodiments, the numeral values may be adjusted according to practical needs, and the disclosure is not limited thereto.

Furthermore, referring to FIG. 3C and FIG. 3D, which are similar to FIG. 3A, the first beam splitting microstructures M1 in FIG. 3C are far from the screen center 120c a little bit. In FIG. 3C, an angle γ is included between the propagating direction of the image beam IBb and the direction perpendicular to the screen module 120, and the angle γ is about 8 degrees. An angle α is included between the propagating direction of the image beam IBa and the direction perpendicular to the screen module 120, and the angle α is about −2 degrees. An angle β is included between the propagating direction of the image beam IBc and the direction perpendicular to the screen module 120, and the angle β is about 17 degrees. In FIG. 3C, since the region is far from the screen center 120c, the difference in slopes of the surface plane P1 and surface plane P3 is greater than that in FIG. 3A so as to achieve similar effect of FIG. 3A. In this embodiment, the included angle φ2 between the surface plane P1 of each of the first beam splitting microstructure M1 and the surface plane P3 of the other adjacent first beam splitting microstructure M1 is about 111 degrees, the included angle φ1 between the surface plane P1 and the first surface S1 is about 37.1 degrees, and the included angle between the surface plane P3 and the first surface S1 is about 31.9 degrees. Therefore, a distance J12 (for example, 42 mm in FIG. 3C) between the first stereo image viewing zone VZ1 and the second stereo image viewing zone VZ2 and a distance J23 (for example, 17 mm in FIG. 3C) between the second stereo image viewing zone VZ2 and the third stereo image viewing zone VZ3 may become similar as well, wherein the widths W1, W2, and W3 of the first stereo image viewing zone VZ1 (641 mm for example), the second stereo image viewing zone VZ2 (510.7 mm for example), and the third stereo image viewing zone VZ3 (446 mm for example) on the observation plane IP are similar, so as to achieve the effects similar to the embodiment in FIG. 3A.

Furthermore, referring to FIG. 3E and FIG. 3F, which are similar to FIG. 3A and FIG. 3C, the first beam splitting microstructures M1 in FIG. 3E is farther from the screen center 120c than the first beam splitting microstructures M1 in FIG. 3C. In FIG. 3C, an angle γ is included between the propagation direction of the image beam IBb and the direction perpendicular to the screen module 120 (namely the direction of the Z axis), and the angle γ is about 15 degrees. An angle α is included between the propagating direction of the image beam IBa and the direction perpendicular to the screen module 120, and the angle α is about 6 degrees. An angle β is included between the propagating direction of the image beam IBc and the direction perpendicular to the screen module 120, and the angle β is about 24 degrees. In FIG. 3E, since the region is farther from the screen center 120c, the difference in slopes of the surface plane P1 and surface plane P3 is set much more greater than that in FIG. 3C so as to achieve similar effect of FIG. 3C. In this embodiment, the included angle φ2 between the surface plane P1 of each of the first beam splitting microstructure M1 and the surface plane P3 of the other adjacent first beam splitting microstructure M1 is about 111 degrees, the included angle φ1 between the surface plane P1 and the first surface S1 is about 40.9 degrees, and the included angle between the surface plane P3 and the first surface S1 is about 28.1 degrees. Therefore, a distance J12 (for example, 14.7 mm in FIG. 3E) between the first stereo image viewing zone VZ1 and the second stereo image viewing zone VZ2 and a distance J23 (for example, 16 mm in FIG. 3E) between the second stereo image viewing zone VZ2 and the third stereo image viewing zone VZ3 may become similar as well, wherein the widths W1, W2, and W3 of the first stereo image viewing zone VZ1 (860 mm for example), the second stereo image viewing zone VZ2 (509 mm for example), and the third stereo image viewing zone VZ3 (384 mm for example) on the observation plane IP are similar, such that the effects similar to the embodiment in FIG. 3A can still be achieved, which is not described herein. It worth noting that the numeral values in the embodiment of FIG. 3A to FIG. 3F are derived based on the assumption that the diffusion angle of each image beams IB is 0.1 degree, hereby the viewer may observe large enough images on the observation plane IP. For example, each of the image beams IB has a diffusion angle of 0.1 degree, and the image size of the image beams IB after being transmitted through the light diffusion layer 122 and projected on the observation plane IP is about 30 mm. Therefore, the needs for viewing can be satisfied.

Figure 4A:
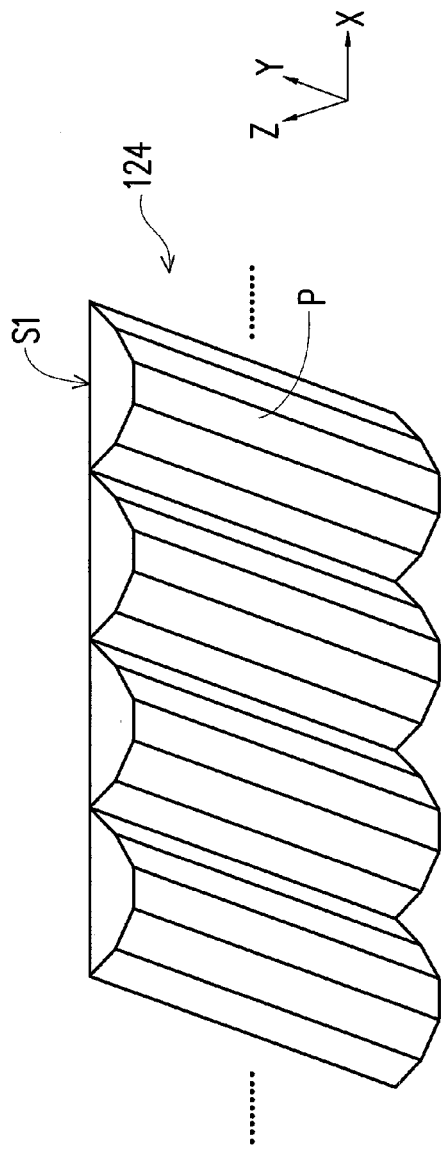
FIG. 4A illustrates an embodiment of the beam splitting layer of FIG. 1.
Figure 4B:
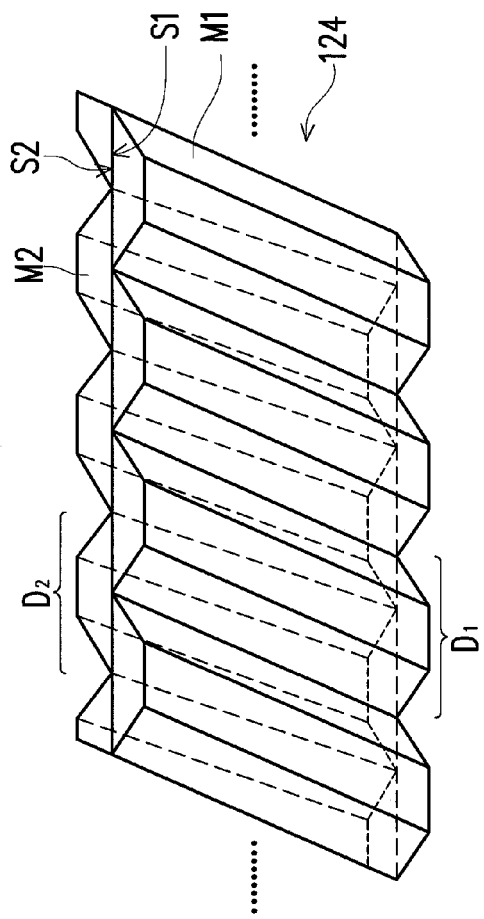
FIG. 4B illustrates another embodiment of the beam splitting layer of FIG. 1.

FIG. 4A illustrates an embodiment of the beam splitting layer of FIG. 1. FIG. 4B illustrates another embodiment of the beam splitting layer of FIG. 1. Referring to FIG. 4A and FIG. 4B, the first beam splitting microstructures M1 may have more surface planes P, for examples, each first beam splitting microstructure M1 has five surface planes P in FIG. 4A, such that the image beams IB may be duplicated to five different stereo image viewing zones VZ without sacrificing projecting resolution, and the relevant detailed descriptions may refer to the paragraphs related to FIG. 3A and are not described herein. Besides, in FIG. 4B, the beam splitting layer 124 may further include a second surface S2 opposite to the first surface S1 and a plurality of second beam splitting microstructures M2 periodically arranged and disposed on the second surface S2. Each of the second beam splitting microstructures M2 has a plurality of surface planes P with different slopes. In details, the second beam splitting microstructures M2 may be arranged along the first direction (as illustrated in FIG. 1 and FIG. 4A). The number of the surface planes having different slopes of each first beam splitting microstructure M1 is M, and the number of the surface planes having different slopes of each second beam splitting microstructures M2 is N, and the number of the stereo image viewing zones VZ is M×N along the first direction.

For example, in this embodiment, the first beam splitting microstructures M1 and the second beam splitting microstructures M2 have 3 surface planes, which is as the trapezoidal beam splitting microstructures illustrated in FIG. 4B, but the disclosure is not limited thereto. In other embodiments, the number of the surface plane P of each first beam splitting microstructure M1 and the number of the surface plane P of each second beam splitting microstructure M2 may be different, and the widths D1 of each first beam splitting microstructure M1 and the widths D2 of each second beam splitting microstructure M2 may be identical or different. Therefore, in this embodiment, the image beams IB may firstly be duplicated to form three sub image beams IBS which are projected to different stereo image viewing zones VZ, and each of the sub image beams IBS may secondly divided into three sub image beams IBS' which are projected to different stereo image viewing zones VZ. In other words, the image beams IB would be divided into 3×3=9 sub image beams IBS after being transmitted through the first beam splitting microstructures M1 and the second beam splitting microstructures M2 and being projected to nine stereo image viewing zones VZ. Therefore, the beam splitting layer 124 may further increase the number of the stereo image viewing zones VZ by the first beam splitting microstructures M1 and the second beam splitting microstructures M2, and may maintain the resolution of projected images.

However, the stereo display system 100 described in the embodiment of FIG. 1 merely provides an one-dimensional-display, that means, it only provides images having parallax between human two eyes on the direction of the X axis but not on the Y axis. A stereo display system capable of providing two-dimensional-display on both of the X axis and the Y axis through a lens array will be described hereafter.

Figure 5:
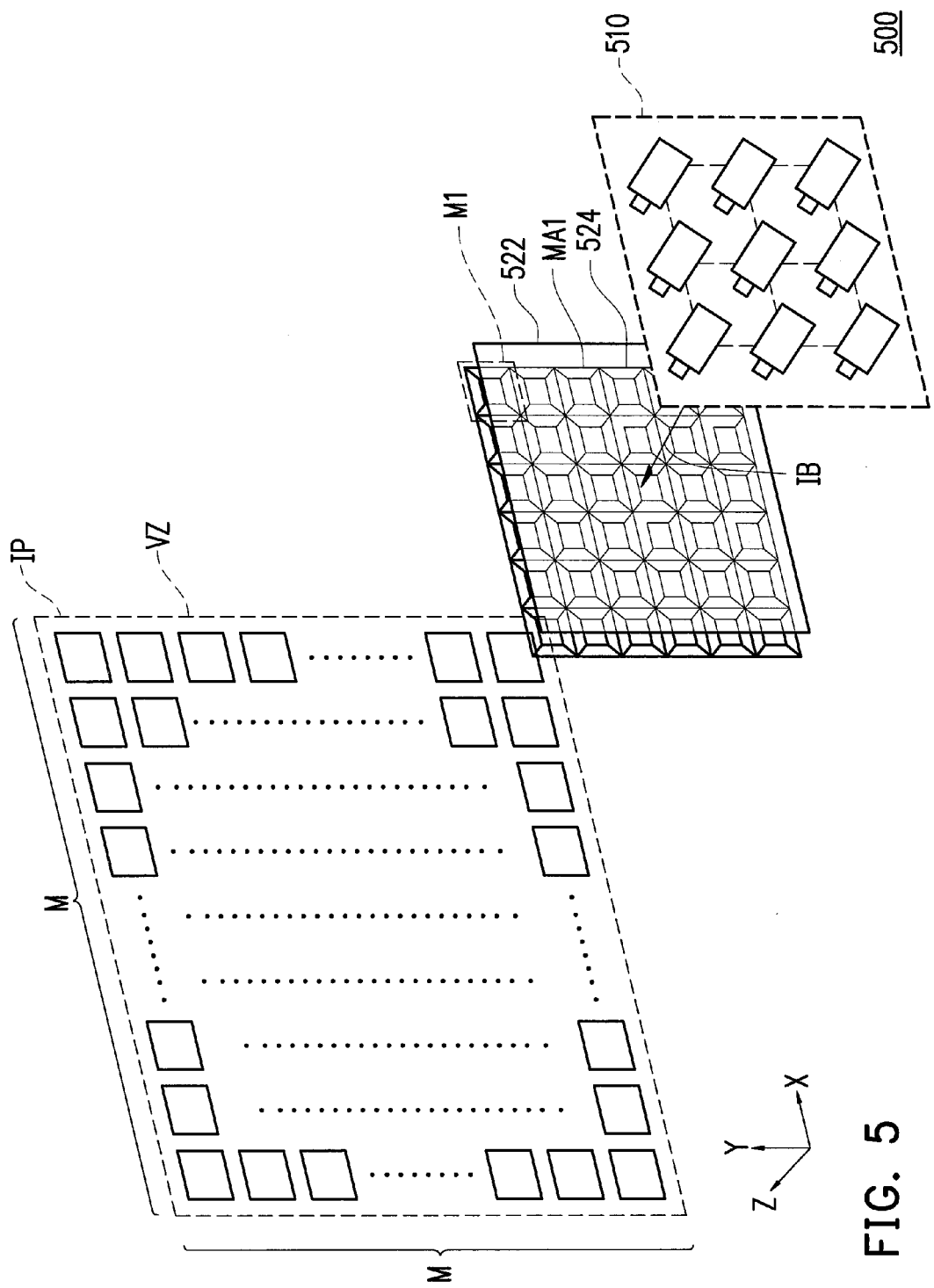
FIG. 5 illustrates a stereo display system according to another embodiment of the present disclosure.

FIG. 5 illustrates a stereo display system according to another embodiment of the present disclosure. Referring to FIG. 1 and FIG. 5, the embodiment of FIG. 5 is similar to the embodiment of FIG. 1, and the difference there between lies on that the projection apparatuses 510 are further arranged along a second direction perpendicular to the first direction, and the first beam splitting microstructures M1 are arranged along the direction parallel to the second direction. The first beam splitting microstructures M1 of the beam splitting layer 524 are arranged along the first direction and the second direction to form a beam splitting matrix MA1, wherein the number of the surface planes P on a cross-section plane of each first beam splitting microstructure along the first direction and the second direction is M, the number of the stereo image viewing zones VZ along the first direction is M, and the number of the stereo image viewing zones VZ along the second direction is M also. For example, referring to FIG. 5, in this embodiment, the first beam splitting microstructures M1 may be the three-dimensional trapezoid having four side surfaces and a top surface. However, this shape shown in the present embodiment is only for illustration, the disclosure is not limited thereto. The number of the surface planes P on the cross-section plane for the first beam splitting microstructures M1 along the first direction is three, and the number of the surface planes P on the cross-section plane for the first beam splitting microstructures M1 along the second direction is three as well. However, the disclosure is not limited thereto. Therefore, the image beams IB projected by the 2-dimensional projection apparatuses 510 may be projected on the observation plane IP through the 2-dimensional first beam splitting microstructures M1 to form M×M stereo image viewing zones VZ. The viewer may observe complete stereo images carried by the image beams IB on the stereo image viewing zones VZ arranged in 2 dimensions. Thus, the stereo display system 500 may be applied in large cinemas and large displaying apparatuses, so as to satisfy the viewers located in different stereo image viewing zones and watching from different angles at the same time.

Figure 6:
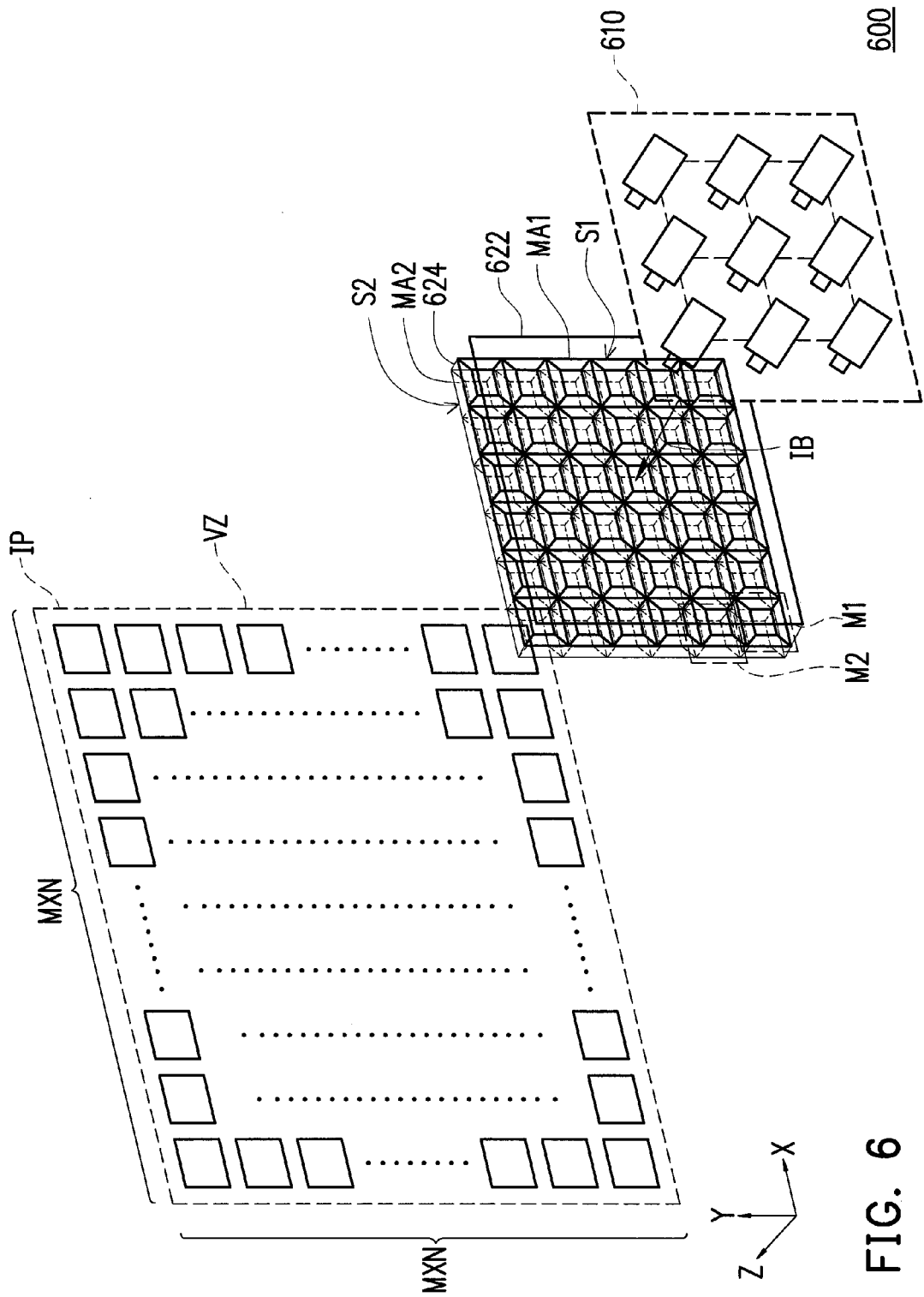
FIG. 6 illustrates an embodiment of the beam splitting layer of FIG. 5.

FIG. 6 illustrates an embodiment of the beam splitting layer of FIG. 5. Referring to FIG. 1, FIG. 5, and FIG. 6. Similar to the beam splitting layer 524 in FIG. 5, however, in this embodiment, the beam splitting layer 624 includes a beam splitting matrix MA1 and a beam splitting matrix MA2 formed by the first beam splitting microstructures M1 and the second beam splitting microstructures M2 respectively arranging along the first direction and the second direction, wherein the number of the surface planes P on a cross-section plane of each first beam splitting microstructure M1 along the first direction and the second direction is M, the number of the surface planes P on a cross-section plane of each second beam splitting microstructures M2 along the first direction and the second direction is N, the number of the stereo image viewing zones VZ along the first direction is M×N, and the number of the stereo image viewing zones VZ along the second direction is M×N as well. For example, the first beam splitting microstructures M1 and the second beam splitting microstructures M2 may be the three-dimensional trapezoid having four side surfaces and a top surface. The number of the surface planes P on a cross-section plane of each first beam splitting microstructure M1 along the first direction and the second direction is three, and the number of the surface planes P on a cross-section plane of each second beam splitting microstructures M2 along the first direction and the second direction is three as well. Thus, the beam splitting layer 624 may furtherly divides the image beams IB to 3×3=9 stereo image viewing zones VZ along the first direction, and divides the image beams IB to 3×3=9 stereo image viewing zones VZ along the second direction also. In other words, the beam splitting layer 624 is capable of dividing the image beams IB into 9×9=81 stereo image viewing zones VZ and increasing the number of the stereo image viewing zones VZ of the stereo display system 600 without sacrificing image resolution, so as to satisfy the viewing needs. It worth noting that the size of the first beam splitting microstructures M1 and the second beam splitting microstructures M2 may be identical or different, and the intervals between the first beam splitting microstructures M1 and between the second beam splitting microstructures M2 may be identical or different. The beam splitting layer 624 illustrated in FIG. 6 is illustrative for the present embodiment, however, the disclosure is not limited thereto.

Figure 7A:
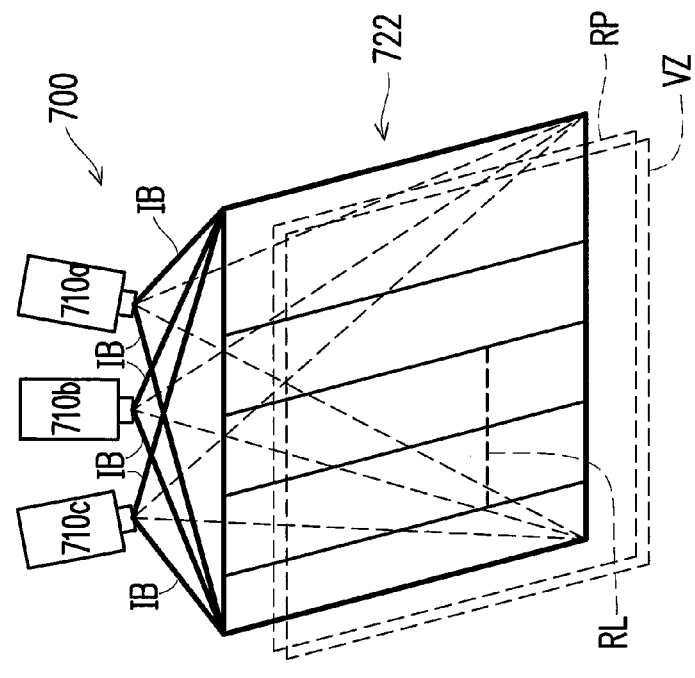
FIG. 7A illustrates a schematic view of the light diffused by the light diffusion layer when the beam adjusting layer is not disposed according to an embodiment of the present disclosure.
Figure 7B:
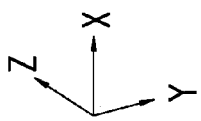
FIG. 7B illustrates the schematic view of the beam shape of the image beams diffused by the light diffusion layer in the embodiment of FIG. 7A.
Figure 7C:
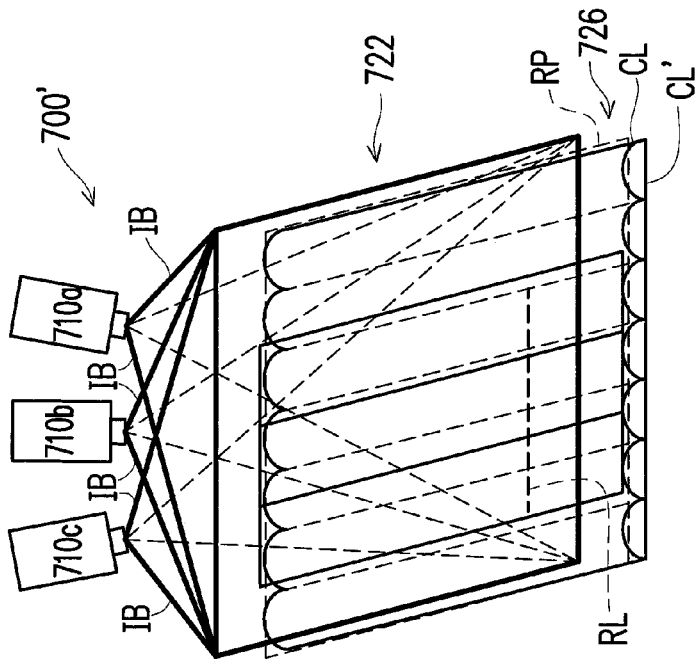
FIG. 7C illustrates a schematic view of the light diffused by the light diffusion layer when the beam adjusting layer is disposed in still another embodiment.
Figure 7D:
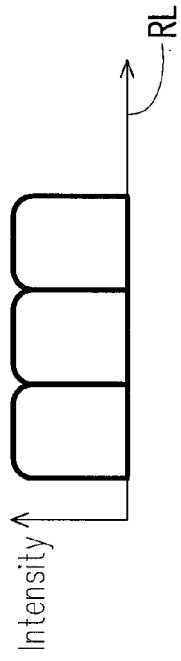
FIG. 7D illustrates the schematic view of the beam shape of the image beams diffused by the light diffusion layer in the embodiment of FIG. 7C.

FIG. 7A illustrates a schematic view of the light diffused by the light diffusion layer when the beam adjusting layer is not disposed according to an embodiment of the disclosure. FIG. 7B illustrates the schematic view of the beam shape of the image beams diffused by the light diffusion layer in the embodiment of FIG. 7A. FIG. 7C illustrates a schematic view of the light diffused by the light diffusion layer when the beam adjusting layer is disposed in still another embodiment. FIG. 7D illustrates the schematic view of the beam shape of the image beams diffused by the light diffusion layer in the embodiment of FIG. 7C. Referring to FIG. 7A and FIG. 7B first, in the embodiment of FIG. 7A, the light diffusion layer 722 includes a first diffusion direction F1 and the second diffusion direction F2. The image beams IB are diffused with a first diffusion angle $\phi 1$ corresponding to the first diffusion direction F 1, and the image beams IB are diffused with a second diffusion angle $\theta 2$ corresponding to the second diffusion direction F2, wherein the first diffusion angle $\theta 1$ is greater than the second diffusion angle $\theta 2$. In the present embodiment, the first diffusion angle $\theta 1$ is 40 degrees and the second diffusion angle $\theta 2$ is 0.2 degree for example. The first diffusion direction F1 may be perpendicular to the first direction, and the second diffusion direction F2 may be parallel to the first direction, wherein the first diffusion direction F1 and the second diffusion direction F2 locate on a reference plane RP parallel with the light diffusion layer 735. For example, in the embodiment of FIG. 7A, the reference plane RP is a surface close the stereo image viewing zones VZ, and the projection apparatuses 710a, 710b, and 710c may be arranged along the first direction and emit the image beams IB toward the light diffusion layer 722, wherein the light diffusion layer 722 is, for example, an optical diffusion film in the present embodiment, and the first diffusion direction F1 is perpendicular to the first direction, while the second diffusion direction F2 is parallel to the first direction. The image beams IB propagated to the light diffusion layer 722 may diffuse along the direction perpendicular to the first direction, but scarcely diffuse along the direction parallel to the first direction. In short, the diffusion angle of the image beams IB along the direction of the Y axis is far more greater than the diffusion angle of the image beams IB along the direction of the X axis after the image beams IB are transmitted through the light diffusion layer 722 as described in the embodiment of FIG. 1, such that the viewers may observe stereo images along the first direction. However, referring to FIG. 7A and FIG. 7B, since the image beams IB projected by the projection apparatuses 710a, 710b, and 710c may be Gaussian beams, such that the image beams may easily overlapped to one another, such as the waveform overlapping situation shown in a reference line RL in FIG. 7B. Moreover, even black bands (for example, the black bands BB shown in FIG. 7B) may occur and thus the moiré effect may appear in images, or the situation of the crosstalk between stereo images may occur and thus the image quality may be affected.

However, in the embodiment of FIG. 7C and FIG. 7D, the black bands effect resulted from multiple overlapped Gaussian beams may be ameliorated by disposing a beam adjusting layer 726 for adjusting the beams' shape, wherein the beam adjusting layer 726 is disposed between the light diffusion layer 722 and the stereo image viewing zones VZ. The beam adjusting layer 726 may include a plurality of beam adjusting microstructures CL, and the beam adjusting layer 726 may change the beam shapes of the image beams IB, such that the projections of the image beams IB in the stereo image viewing zones VZ are mutually adjacent without overlaps. As illustrated in FIG. 7D, the square-wave-shaped beams are closely adjacent to one another, such that the black bands effect may be reduced. In detail, the beam adjusting microstructures CL are a plurality of periodically arranged beam adjusting rod lenses CL', and the arranging direction of the beam adjusting rod lenses CL' is parallel to the first direction. In this embodiment, the beam adjusting rod lenses CL' may have a cylindrical surface with a tiny opening angle (is about 0.5 degree in this embodiment), but the disclosure is not limited thereto.

Figure 8C:
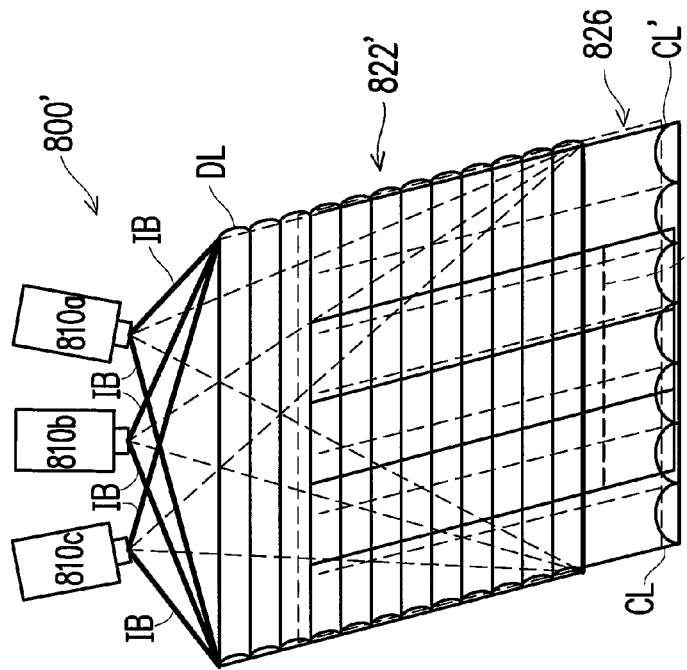
FIG. 8C illustrates a schematic view of the light diffused by the light diffusion layer when the beam adjusting layer is disposed in still another embodiment.
Figure 8D:
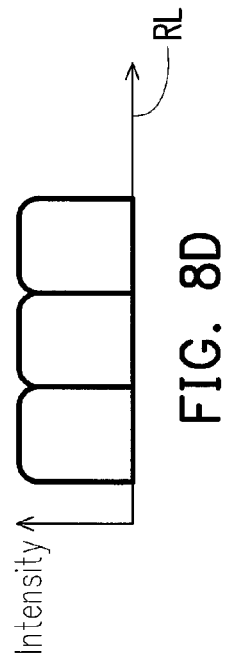
FIG. 8D illustrates the schematic view of the beam shape of the image beams diffused by the light diffusion layer in the embodiment of FIG. 8C.
Figure 8A:
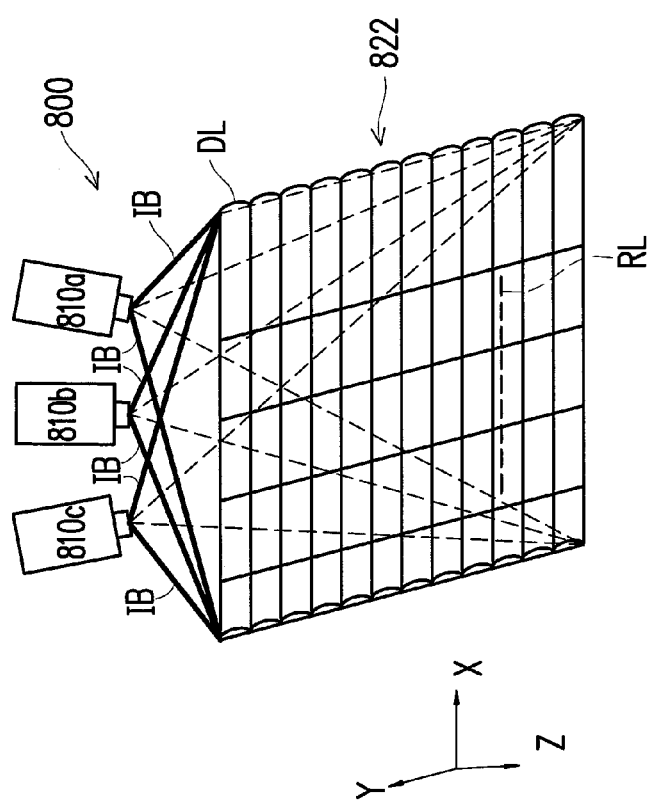
FIG. 8A illustrates a schematic view of the light diffused by the light diffusion layer when the beam adjusting layer is not disposed according to an embodiment of the present disclosure.
Figure 8B:
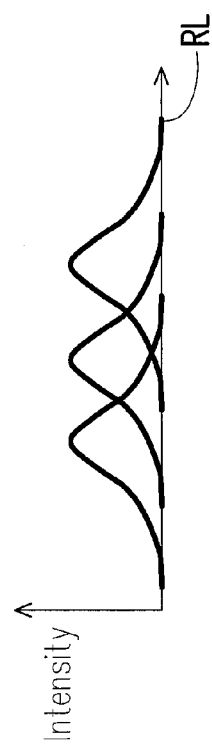
FIG. 8B illustrates the schematic view of the beam shape of the image beams diffused by the light diffusion layer in the embodiment of FIG. 8A.

FIG. 8A illustrates a schematic view of the light diffused by the light diffusion layer when the beam adjusting layer is not disposed according to an embodiment of the disclosure. FIG. 8B illustrates the schematic view of the beam shape of the image beams diffused by the light diffusion layer in the embodiment of FIG. 8A. FIG. 8C illustrates a schematic view of the light diffused by the light diffusion layer when the beam adjusting layer is disposed in still another embodiment. FIG. 8D illustrates the schematic view of the beam shape of the image beams diffused by the light diffusion layer in the embodiment of FIG. 8C. Referring to FIG. 8A and FIG. 8B. Similar to FIG. 7A and FIG. 7B, however, the difference is that the light diffusion layer 822 includes a plurality of periodically arranged diffusion rod lenses DL, and the arranging direction of the diffusion rod lenses DL is perpendicular to the first direction. Therefore, the effect similar with the beam diffusion film described in the embodiment of FIG. 7A and FIG. 7B may be obtained, and is not described herein. Furthermore, in the embodiment of FIG. 8C, the arranging direction of the plurality of the diffusion rod lenses DL periodically arranged on the light diffusion layer 822 is perpendicular to the beam adjusting rod lenses CL'. Therefore, the effect similar to the embodiment of FIG. 7A and FIG. 7B may be obtained, and is not described herein. For example, the diffusion rod lenses DL may be produced by attaching ordinary micro-cylindrical lenses having larger opening angles on the light diffusion layer 822 and then filling up the light diffusion layer 822 with a material having a refractive index slightly larger or slightly smaller than the ordinary micro-cylindrical lenses. In this way, similar effects may be obtained as well.

Figure 9A:
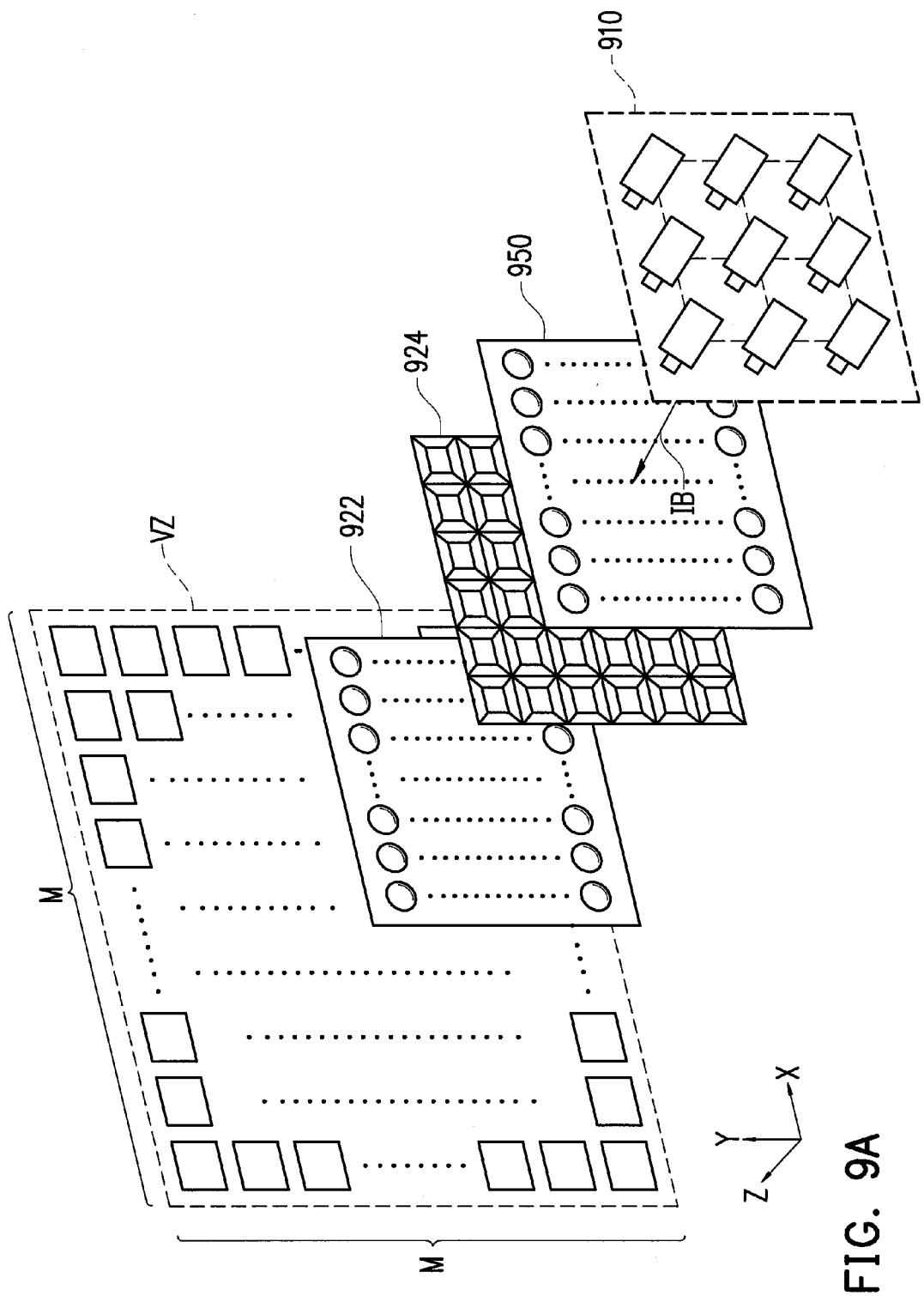
FIG. 9A illustrates a schematic view of the stereo display system according to an embodiment of the present disclosure.
Figure 9C:
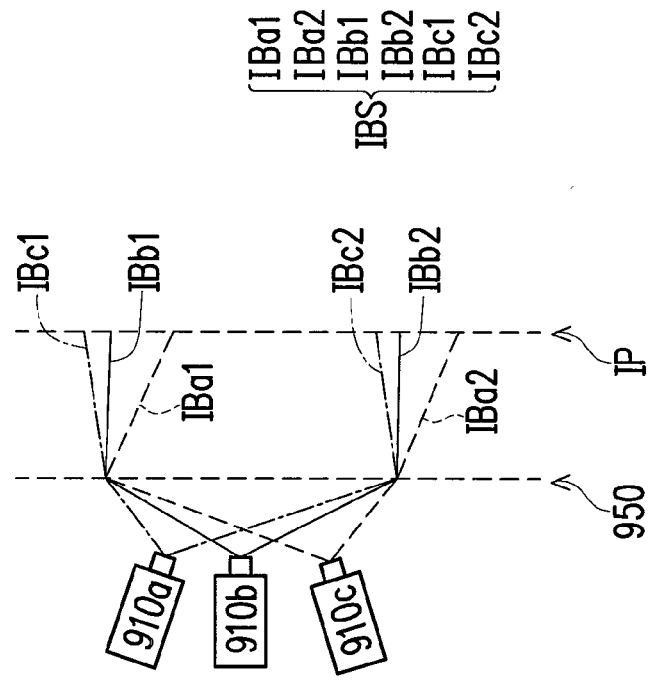
FIG. 9C illustrates the schematic view of the optical path when the optical convergent layer is disposed in the embodiment of FIG. 9A.
Figure 9B:
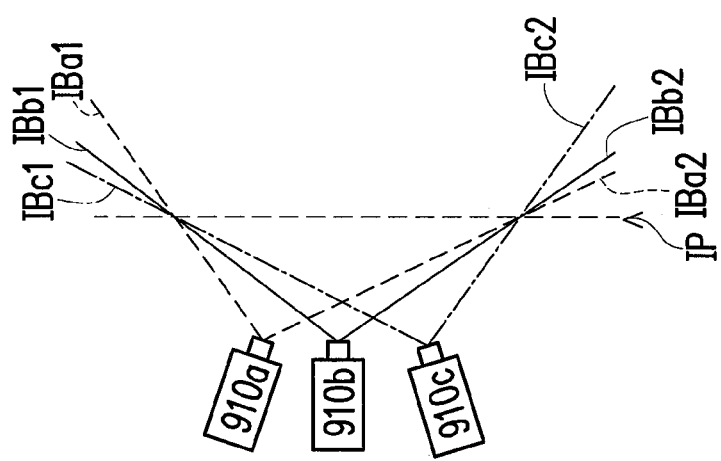
FIG. 9B illustrates the schematic view of the optical path when the optical convergent layer is not disposed in the embodiment of FIG. 9A.

FIG. 9A illustrates a schematic view of the stereo display system according to an embodiment of the present disclosure. FIG. 9B illustrates the schematic view of the optical path when the optical convergent layer is not disposed in the embodiment of FIG. 9A. FIG. 9C illustrates the schematic view of the optical path when the optical convergent layer is disposed in the embodiment of FIG. 9A. Referring to FIG. 5, FIG. 9A to FIG. 9C. Similar to the stereo display system 500 in the embodiment of FIG. 5, however, the difference is that the stereo display system 900 may further include an optical convergent layer 950 disposed between the projection apparatuses 910 and the light diffusion layer 922. In this embodiment, the projection apparatuses 910 are aligned to form a projector matrix as illustrated in FIG. 9A, but the disclosure is not limited thereto. After being transmitted through the optical convergent layer 950, the sub image beams IBS of each of the image beams IB are substantially parallel to one another on at least one imaging plane. In detail, in the present embodiment, the optical convergent layer 950 is an optical convergent lens, for example, a convex lens or a Fresnel lens, and the focal point of the optical convergent lens substantially locates on the projection position of the stereo display system 900, namely, on the observation plane IP. For example, in the present embodiment, the sub image beam IBa1 and the sub image beam IBa2 emitted from the projection apparatus 910a are substantially parallel after being transmitted through the optical convergent layer 950, the sub image beam IBb1 and the sub image beam IBb2 emitted from the projection apparatus 910b are substantially parallel to each other after being transmitted through the optical convergent layer 950, and the sub image beam IBc1 and the sub image beam IBc2 emitted from the projection apparatus 910c are substantially parallel to each other after being transmitted through the optical convergent layer 950. Therefore, the optical convergent layer 950 may converge the sub image beams IBS and make the sub image beams IBS propagates toward the observation plane IP. Thus, the stereo display system 900 can provide not only orthographic-perspective images along one dimension (for example, the X axis), but also orthographic-orthographic images along two dimensions (for example, the plane consist of the X axis and the Y axis). Besides, the focal length of the optical convergent layer 950 may be smaller than the projection distance, such that the projection direction of the sub image beams may change from parallel to convergent. Therefore, the stereo display system 900 can also provide perspective-perspective projection along one dimension (for example, the X axis).

Besides, in this embodiment, the first beams splitting microstructures M1 of the beam splitting layer 924 may further be arranged along a second direction perpendicular to the first direction to form a two-dimensional matrix. However, in other embodiments, the beam splitting layer 924 may also have the same first beam splitting microstructure M1 and second beam splitting microstructure M2 shown in FIG. 6, the disclosure is not limited thereto. Besides, in the present embodiment, the beam adjusting microstructures CL are a plurality of beam adjusting lenses CL", and the beam adjusting lenses CL" may be arranged along the first direction and the second direction, as the spherical lenses matrix illustrated in FIG. 9A. However, in other embodiments, the lens shapes suitable for converging light may be applied as well, the disclosure is not limited thereto.

Therefore, in an embodiment of the disclosure, each of the image beams is divided into a plurality of sub image beams which are transmitted toward a plurality of stereo image viewing zones with different beam splitting angles, such that the number of the stereo image viewing zones of the stereo display system may be increased and the viewers may observe stereo images at different positions. A plurality of beam splitting microstructures of the beam splitting layer may be arranged in one dimension or in two dimensions, such that the number of the stereo image viewing zones may be further increased, while the images resolution can be maintained in a good condition. In an embodiment of the disclosure, the beam adjusting layer is used to change the beam shapes of the image beams, such that the projections of the image beams on the stereo image viewing zones are closely adjacent to one another without overlaps. Thus, the discontinuity of the projection images or the crosstalk caused by the overlapped images can be avoided. Besides, in an embodiment of the disclosure, the sub image beams of each of the image beams are mutually parallel on a reference imaging plane by utilizing an optical convergent layer, which increases the degree of convergence of the image beams projected on the projection screen. Thus, an embodiment of the disclosure may be applied in orthographic-perspective displays.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A stereo display system comprising:
   a plurality of projection apparatuses, configured to project a plurality of image beams respectively; and
   a screen module, disposed in front of the projection apparatuses, wherein the image beams are transmitted towards the screen module, and the screen module comprises:
      a light diffusion layer, having at least one diffusion direction and diffusing the image beams along the diffusion direction with a diffusion angle corresponding to the diffusion direction; and
      a beam splitting layer, the light diffusion layer being disposed between the beam splitting layer and the projection apparatuses, wherein each of the image beams diffused by the light diffusion layer is divided into a plurality of sub image beams after passing through the beam splitting layer, and the sub image beams of each image beam are propagated with different angles, such that the image beams form a plurality of stereo image viewing zones after passing through the screen module.

2. The stereo display system as recited in claim 1, wherein the beam splitting layer has a first surface and a plurality of first beam splitting microstructures periodically arranged and disposed on the first surface, and each of the first beam splitting microstructures has a plurality of surface planes with different slopes.

3. The stereo display system as claimed in claim 2, wherein the projection apparatuses are arranged along a first direction, and the first beam splitting microstructures and the stereo image viewing zones are arranged in parallel with the first direction.

4. The stereo display system as claimed in claim 3, wherein the number of the surface planes of each first beam splitting microstructure is M, and the number of the stereo image viewing zones is M.

5. The stereo display system as claimed in claim 3, wherein:
   the projection apparatuses are further arranged along a second direction perpendicular to the first direction;
   the first beam splitting microstructures are arranged along the second direction;
   the first beam splitting microstructures of the beam splitting layer are arranged along the first direction and the second direction to form a beam splitting matrix; and
   the number of the surface planes on a cross-section plane of each first beam splitting microstructure along the first direction and the second direction is M, the number of the stereo image viewing zones along the first direction is M, and the number of the stereo image viewing zones along the second direction is M.

6. The stereo display system as claimed in claim 3, wherein the beam splitting layer further comprises a second surface opposite to the first surface and a plurality of second beam splitting microstructures periodically arranged and disposed on the second surface, and each of the second beam splitting microstructures has a plurality of surface planes with different slopes.

7. The stereo display system as claimed in claim 6, wherein the second beam splitting microstructures are arranged along the first direction.

8. The stereo display system as claimed in claim 7, wherein the number of the surface planes having different slopes of each first beam splitting microstructure is M, and the number of the surface planes having different slopes of each second beam splitting microstructure is N, and the number of the stereo image viewing zones is M×N along the first direction.

9. The stereo display system as claimed in claim 7, wherein:
   the projection apparatuses are further arranged along a second direction perpendicular to the first direction;
   the first beam splitting microstructures and the second beam splitting microstructures are arranged along the second direction;
   the first beam splitting microstructures and the second beam splitting microstructures of the beam splitting layer are respectively arranged along the first direction and the second direction to form a beam splitting matrix; and
   the number of the surface planes on a cross-section plane of each first beam splitting microstructure along the first direction and the second direction is M, the number of the surface planes on a cross-section plane of each second beam splitting microstructures along the first direction and the second direction is N, the number of the stereo image viewing zones along the first direction is M×N, and the number of the stereo image viewing zones along the second direction is M×N.

10. The stereo display system as claimed in claim 3, wherein the at least one diffusion direction of the light diffusion layer comprises a first diffusion direction and a second diffusion direction, and the image beams are diffused with a first diffusion angle corresponding to the first diffusion direction, and the image beams are diffused with a second diffusion angle corresponding to the second diffusion direction, and the first diffusion angle is greater than the second diffusion angle.

11. The stereo display system as claimed in claim 10, wherein the first diffusion direction is perpendicular to the first direction, and the second diffusion direction is parallel with the first direction, wherein the first diffusion direction and the second diffusion direction are on a reference plane parallel with the light diffusion layer.

12. The stereo display system as claimed in claim 11, wherein the light diffusion layer comprises a plurality of diffusion rod lenses periodically arranged, and an arranging direction of the diffusion rod lenses is perpendicular to the first direction.

13. The stereo display system as claimed in claim 11, wherein the light diffusion layer is a light diffusion film.

14. The stereo display system as claimed in claim 2, further comprising a beam adjusting layer disposed between the light diffusion layer and the stereo image viewing zones, wherein the light adjusting layer comprises a plurality of beam adjusting microstructures, and the beam adjusting layer changes the beam shapes of the image beams, such that projections of the image beams on the stereo image viewing zones are substantially adjacent to one another and are not overlapped.

15. The stereo display system as claimed in claim 14, wherein the beam adjusting microstructures are a plurality of beam adjusting rod lenses periodically arranged, and an arranging direction of the beam adjusting rod lenses are parallel with a first direction.

16. The stereo display system as claimed in claim 15, wherein the light diffusion layer comprises a plurality of diffusion rod lenses periodically arranged, the arranging direction of the diffusion rod lenses is perpendicular to the arranging direction of the beam adjusting rod lenses.

17. The stereo display system as claimed in claim 14, wherein the first beam splitting microstructures are further arranged along a second direction perpendicular to a first direction, and the beam adjusting microstructures are a plurality of beam adjusting lenses, and the beam adjusting lenses are arranged respectively along the first direction and the second direction.

18. The stereo display system as claimed in claim 1, further comprising an optical convergent layer, disposed between the projection apparatuses and the light diffusion layer, wherein after the image beams pass through the optical convergent layer, the sub image beams of each image beam are substantially parallel to one another on at least one imaging plane.

19. The stereo display system as claimed in claim 18, wherein each of the image beams substantially converges to each other on the at least one imaging plane.

20. The stereo display system as claimed in claim 18, wherein the optical convergent layer is an optical convergent lens, and a focal point of the optical convergent lens substantially locates on a projection position of the stereo display system.

21. The stereo display system as claimed in claim 20, wherein the focal point of the optical convergent lens substantially locates between the optical convergent lens and a projector matrix.

\* \* \* \* \*